(12) United States Patent
Hager et al.

(10) Patent No.: US 6,980,153 B2
(45) Date of Patent: Dec. 27, 2005

(54) RADAR ALTIMETER FOR HELICOPTER LOAD CARRYING OPERATIONS

(75) Inventors: James R. Hager, Golden Valley, MN (US); Thomas W. Heidemann, Anoka, MN (US); Michael H. Brockopp, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 123 days.

(21) Appl. No.: 10/847,510

(22) Filed: May 17, 2004

(65) Prior Publication Data

US 2005/0253750 A1 Nov. 17, 2005

(51) Int. Cl.$^7$ .............................................. G01S 13/08
(52) U.S. Cl. ...................................... 342/120; 342/123
(58) Field of Search ............................... 342/120–123, 342/109, 111, 112, 134, 135, 159, 161, 162

(56) References Cited

U.S. PATENT DOCUMENTS

| | | | | |
|---|---|---|---|---|
| 3,088,109 A | * | 4/1963 | Meyer | 342/99 |
| 3,150,365 A | * | 9/1964 | Wimberly et al. | 342/100 |
| 3,611,367 A | * | 10/1971 | Billottet et al. | 342/58 |
| 3,906,497 A | * | 9/1975 | Brasier | 342/120 |
| 4,431,994 A | * | 2/1984 | Gemin | 342/120 |
| 4,828,382 A | | 5/1989 | Vermilion | |
| 5,109,230 A | * | 4/1992 | Hassenpflug | 342/117 |
| 6,434,085 B1 | | 8/2002 | Nedwell | |
| 6,507,289 B1 | * | 1/2003 | Johnson et al. | 340/970 |
| 6,583,733 B2 | | 6/2003 | Ishihara et al. | |
| 2002/0066829 A1 | * | 6/2002 | DeWitt et al. | 244/181 |
| 2002/0188386 A1 | * | 12/2002 | Day | 701/4 |

FOREIGN PATENT DOCUMENTS

FR 2770904 A1 * 5/1999 ............ G01D 7/08

OTHER PUBLICATIONS

"Application of multiple model estimation to a recursive terrain height correlation system", Mealy, G.; Wang Tang; Automatic Control, IEEE Transactions on vol. 28, Issue 3, Mar 1983 P(s):323-331.*

* cited by examiner

*Primary Examiner*—John B. Sotomayor
(74) *Attorney, Agent, or Firm*—Andrew Abeyta, Esq.; Armstrong Teasdale LLP

(57) ABSTRACT

A radar altimeter for vehicles that operate with a load suspended underneath is described. The radar altimeter includes a transmitter configured to transmit radar signals toward the ground, a receiver configured to receive reflected radar signals from the ground and from the suspended load, and at least one altitude processing channel configured to receive signals from the receiver. The radar altimeter also includes a load profile channel configured to receive signals from the receiver. The load profile channel limits an altitude processing sensitivity of the radar altimeter between the radar altimeter and the suspended load to reduce a likelihood that the radar altimeter will process signals reflected by the suspended load.

20 Claims, 2 Drawing Sheets

RADAR ALTIMETER FOR HELICOPTER LOAD CARRYING OPERATIONS

BACKGROUND OF THE INVENTION

This invention relates generally to radar altimeter operations and more specifically, to systems and methods for addressing radar altimeter operation for a vehicle having a load suspended underneath.

Flight platforms must be able to maintain an altitude during hovering operations. An example of such a flight platform is a helicopter and examples of hovering operations include rescue maneuvers and delivery of loads that are suspended under the helicopter. More particularly, helicopters and other hovering flight platforms are sometimes utilized to carry loads suspended below the helicopter or flight platform. Therefore, such vehicles require an accurate above ground level (AGL) altitude sensing during maneuvers with the load. Particularly important is accurate altitude sensing during load pick up and load set down maneuvers.

Radar altimeters are commonly implemented within such flight platforms as part of an overall flight control system. Some of these flight platforms utilize flight control systems to maintain hovering altitudes, and these flight control systems rely on reliable data from radar altimeters during the hovering operations.

A radar altimeter typically includes a transmitter for applying pulses of electromagnetic energy, at a radio frequency (RF), and at regular intervals to an antenna which then radiates the energy, in the form of a transmit beam, towards the earth's surface. A transmit beam from a radar is sometimes said to "illuminate" an area (e.g. the ground) which reflects (returns) the transmit beam. The reflected beam, sometimes referred to as a ground return, is received at a receive antenna of the radar altimeter. A signal from the receive antenna is processed to determine an altitude.

When the beam is reflected by the ground, an accurate altitude determination is possible. Some known radar altimeters, however, may often lock on to the suspended load (i.e., the beam is reflected by the suspended load rather than by the ground). In such circumstances, the signal from the receive antenna provides a range (e.g., distance) to the load and not a range to the ground below the load.

BRIEF SUMMARY OF THE INVENTION

In one aspect, a radar altimeter for vehicles that operate with a load suspended underneath is provided. The radar altimeter comprises a transmitter configured to transmit radar signals toward the ground, a receiver configured to receive reflected radar signals from the ground and from the suspended load, and at least one altitude processing channel configured to receive signals from the receiver. The radar altimeter also comprises a load profile channel configured to receive signals from the receiver which limits an altitude processing sensitivity of the radar altimeter at distances between the altimeter and the suspended load to reduce a likelihood that the radar altimeter will process signals reflected by the suspended load.

In another aspect, a method for processing radar returns received by a radar altimeter is provided. The method comprises receiving a portion of the radar returns reflected by the ground, receiving a portion of the radar returns reflected by a load suspended under a vehicle which includes the radar altimeter, and limiting an altitude processing sensitivity of the radar altimeter between the radar altimeter and the suspended load to reduce a likelihood that the radar altimeter will process the portion of the radar returns reflected by the suspended load.

In still another aspect, a radar altimeter is provided which receives radar returns reflected from the ground and from a suspended load under the vehicle incorporating the radar altimeter. The radar altimeter separates the radar returns reflected from the suspended load from the radar returns reflected by the ground through utilization of differences in the radar signatures as criteria for separation.

DETAILED DESCRIPTION OF THE INVENTION

Figure 1:
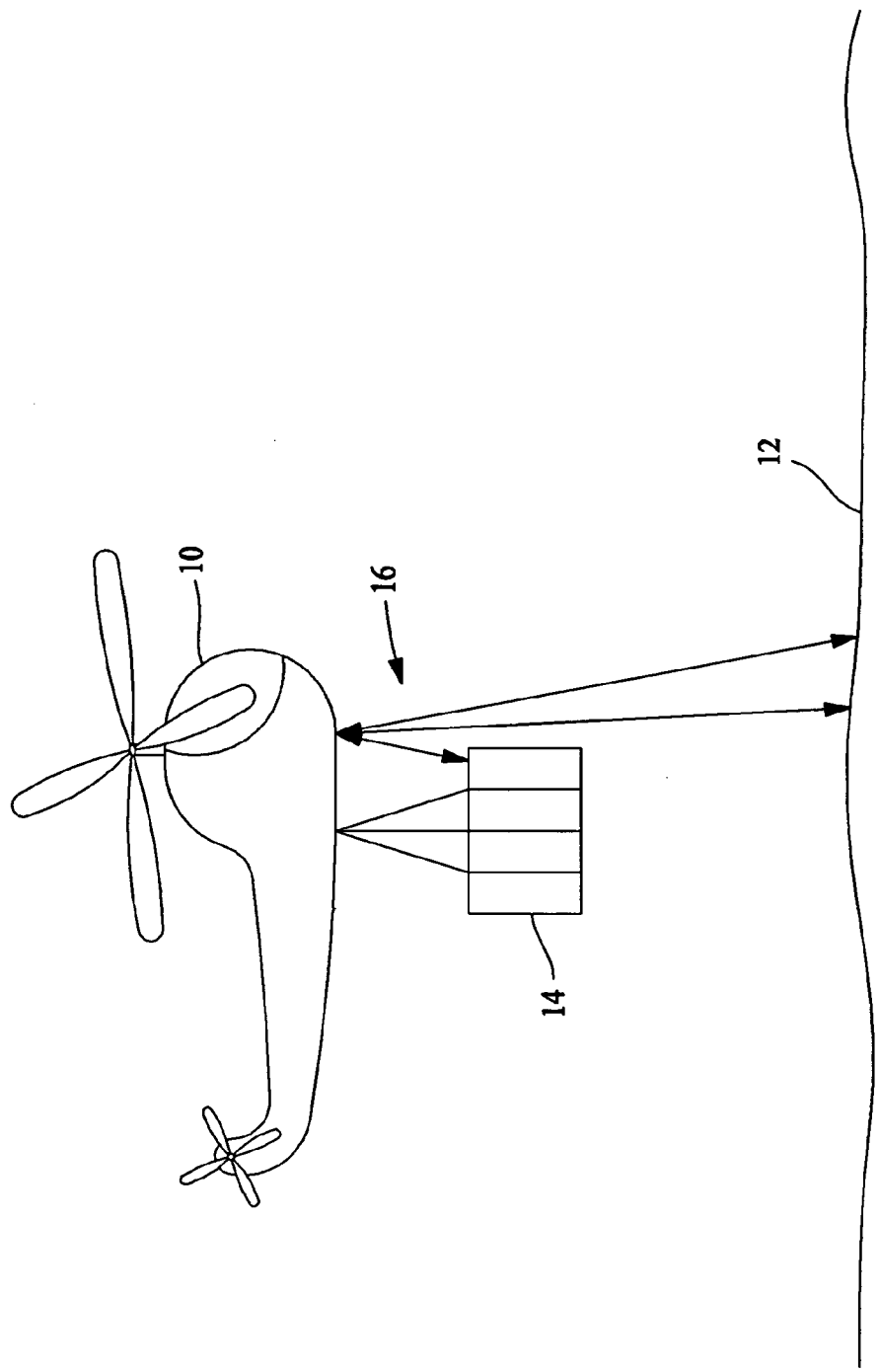
FIG. 1 is a diagram of a helicopter hovering with a suspended load which illustrates transmissions from a radar altimeter reflecting off the load and the ground.

FIG. 1 is a diagram of a helicopter 10 hovering above ground 12. Helicopter 10 further includes a suspended load 14 which in one example, is to be placed on ground 12. Helicopter 10 includes a radar altimeter (not shown) which is transmitting signals 16 toward ground 12. As illustrated, a portion of signals 16 are reflected by ground 12 back to the radar altimeter, and a portion of signals 16 are reflected by suspended load 14 back to the radar altimeter. With known radar altimeters, the processing of signals reflected by both ground 12 and suspended load 14 results in an ambiguous altitude determination. In another scenario, radar altimeter locks onto suspended load 14, and processes only signals 16 that are reflected by suspended load 14. In such a scenario, an altitude calculated by processors within the radar altimeter is the distance between helicopter 10 and suspended load 14 rather than the distance between helicopter 10 and ground 12, which is the actual altitude of helicopter 10.

Figure 2:
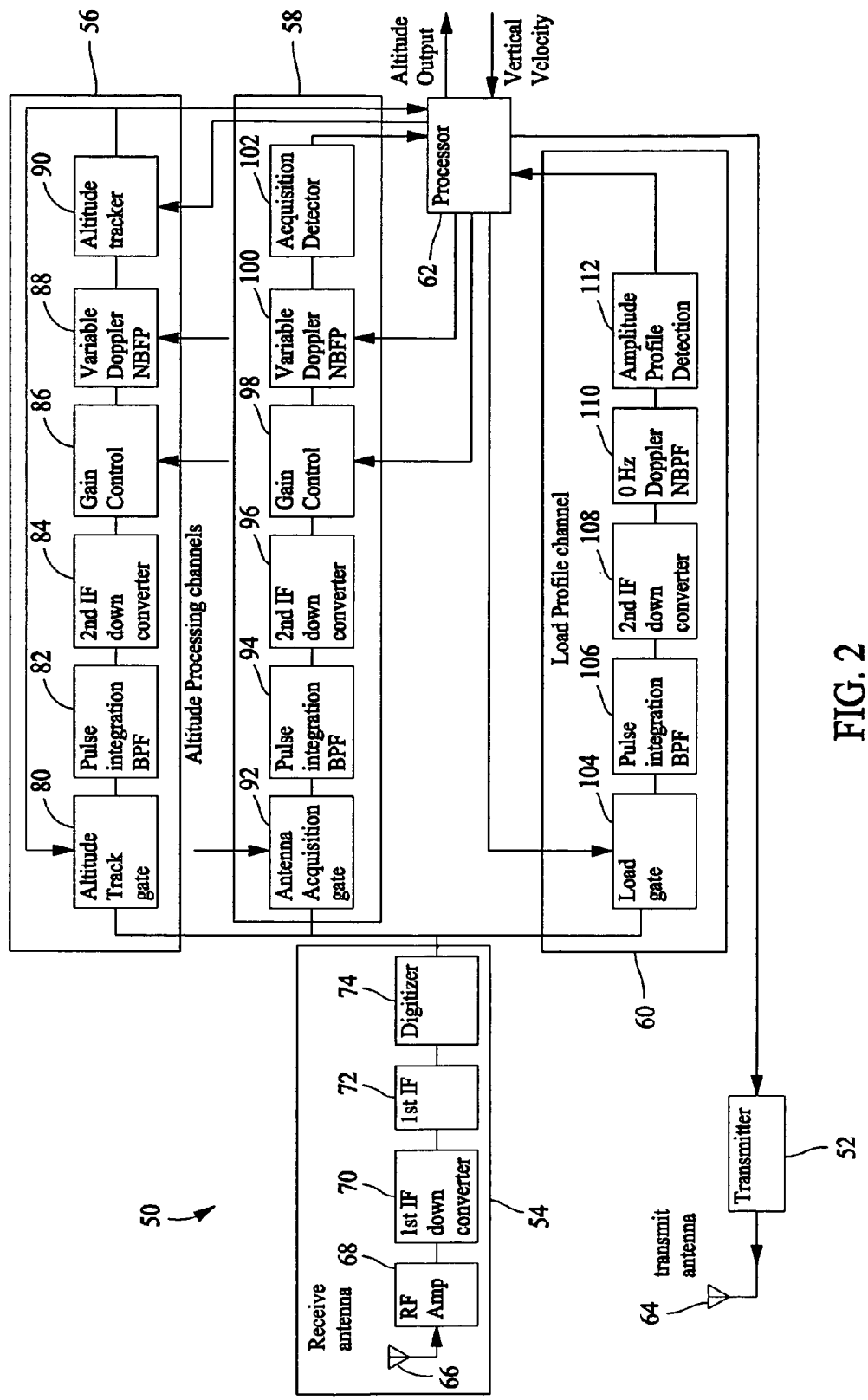
FIG. 2 is a block diagram of a radar altimeter including a load profile channel.

FIG. 2 is a block diagram illustrating one embodiment of a radar altimeter 50 configured to be incorporated in an air vehicle, for example, helicopter 10 (shown in FIG. 1). Radar altimeter 50 includes a transmitter 52, a receiver section 54, altitude processing channels 56 and 58, a load profile channel 60, and a processor 62.

Transmitter 52 transmits pulses of RF energy (e.g., radar signals) through transmit antenna 64. Receive antenna 66 receives radar signals reflected from ground 12 and suspended load 14. The received radar signals are amplified by RF amplifier 68 and mixed down to an intermediate frequency by first IF down converter 70, and further amplified and band limited by first IF amplifier-filter 72. Digitizer 74 digitizes the received signal from first IF amplifier-filter 72 and outputs the digitized samples to altitude processing channels 56 and 58 and load profile processing channel 60.

Altitude processing channel 56 includes an altitude tracking gate 80, a pulse integration band pass filter (BPF) 82, a second IF down converter 84, gain control 86, a variable Doppler narrow BPF 88, and an altitude tracker 90. Altitude processing channel 58 includes an altitude acquisition gate 92, a pulse integration BPF 94, a second IF down converter 96, gain control 98, a variable Doppler narrow BPF 100, and an acquisition detector 102. Load profile processing channel 60 includes a load gate 104, a pulse integration BPF 106, a second IF down converter 108, a zero Hertz Doppler narrow BPF 110, and an amplitude profile detector 112.

Radar range is determined by measuring an amount of time it takes for a radar pulse to travel from transmit antenna 66 to ground 12, to reflect from a target (e.g. ground 12) and then return to receive antenna 64 as a radar return signal. Altitude track gate 80 and altitude acquisition gate 92 are essentially switches that only allow selected samples of the return signal to be processed. In some contexts, a "gate" implies a switch that may be closed for a finite length of time during the gating interval, but in the digital signal processing context, gates correspond to discrete samples taken within the gating interval. The return signal can not get through the gate until the point in time at which the switch is closed. For example, if a radar gate is set to a range of 1000 feet, the gate will wait two microseconds (which is the amount of time corresponding to radar signals traveling a range of about 1000 feet) after transmission, and then close to allow the sampled return signal to pass through. The time the switch is closed is referred to as the gate width. Processor 62 sets the gating interval and gate width of gates 80 and 92 in altimeter 50.

Radar altimeter 50 as described provides separation of the radar return reflected from suspended load 14 from the altitude return (radar return reflected by ground 12) through utilization of differences in the radar signatures, specifically, Doppler frequency and amplitude, as criteria for separation. A Doppler frequency is directly dependent on relative velocity between the radar altimeter (or vehicle incorporating the altimeter) and the surface reflecting the transmissions from the radar altimeter. In the case of suspended load 14, a zero (or near zero) Doppler frequency is always provided, as there is no (or very little) relative velocity between helicopter 10 and suspended load 14. However, when helicopter 10 is in flight, reflections from ground 12 provide a Doppler frequency that is dependent on vertical velocity of helicopter 10. Doppler bandpass filters 88, 100, and 110 are utilized to separate the two reflections (the zero or near zero Doppler return from suspended load 14 and the return from ground 12).

During hovering operations, there is no (or very little) vertical velocity of helicopter 10, so the ground return (e.g., reflections from ground 12) also result in a zero (or near zero) Doppler frequency, which results in the loss of the above described method of separation of the two radar reflections.

In one embodiment, during zero (or near zero) velocity conditions, automatic load return amplitude profile detector 112 is utilized to limit altitude processing sensitivity of radar altimeter 50, in a range vicinity of suspended load 14, while not locking on to suspended load 14. Specifically, altitude sensitivity of radar altimeter 50 is reduced according to a load return profile with respect to radar range or at altitudes equivalent to the distance suspended load 14 is positioned below helicopter 10. The adjustment of sensitivity greatly reduces the possibility that radar altimeter 10 will lock onto suspended load 14 during hovering operations.

Still referring to FIG. 2, radar altimeter 50 is a normal pulse coherent radar altimeter, with controlled frequency Doppler filters 88 and 100 added to the altitude processing channels 56 and 58. Additionally, load profile channel 60 is added to radar altimeter 50. The altitude processing Doppler filters (i.e., Doppler filters 88 and 100) are tuned to a center frequency equal to the Doppler frequency of the vertical velocity of helicopter 10. In one embodiment, vertical velocity sensing is provided by an inertial measurement unit (not shown) incorporated into helicopter 10.

In one embodiment of a suspended load profiling routine, Doppler narrow BPF 110 of load profile processing channel 60 is tuned to a zero Hertz center frequency in order to process only radar signals reflected from suspended load 14 during vertical movement of helicopter 10. Load gate 104 of load profile processing channel 60 incorporates a gate width that is a single digitizer sample wide, in one embodiment, approximately two nanoseconds, based on an aperture width of a high speed analog-to-digital converter (not shown) within digitizer 74. The gate embodied within load gate 104 is continuously moved from zero feet out to an approximate maximum distance between suspended load 14 and helicopter 10, for example, an assumed 100 foot radar range, and back to zero feet. By measuring return amplitude of the signals reflected by suspended load 14 at each range resolution position of load gate 104, an amplitude profile of the load radar signature is generated and provided to processor 62. In one embodiment, the above described suspended load profiling routine is only performed during vertical movement of helicopter 10, so that Doppler shifted radar returns from ground 12 will not contaminate the amplitude profile of the suspended load radar signature for suspended load 14. In other words, the non-zero Doppler shift of the ground return is filtered out by zero Doppler filter 110.

Processor 62 is configured to convert the amplitude profile to a controlled gain with respect to radar range to control altitude gain functions. Thus, during hovering operations, when the altitude Doppler shift is zero, radar altimeter 50 can continue processing and tracking ground returns without locking onto radar returns reflected from suspended load 14. Radar altimeter 50 will not lock onto suspended load 14 since the gain of the radar returns from suspended load 14 is reduced according to the amplitude profile.

The methods and apparatus described above facilitate overcoming radar altimeters locking onto suspended loads below helicopters and other hovering vehicles and not providing usable altitude data. While the invention has been described in terms of various specific embodiments, those skilled in the art will recognize that the invention can be practiced with modification within the spirit and scope of the claims.

What is claimed is:

1. A radar altimeter for vehicles that operate with a load suspended underneath, said altimeter comprising:
   a transmitter configured to transmit radar signals toward the ground;
   a receiver configured to receive radar signals reflected from the ground and reflected from the suspended load;
   at least one altitude processing channel configured to receive signals from said receiver; and
   a load profile channel configured to receive signals from said receiver, said load profile channel limiting an altitude processing sensitivity of said radar altimeter between the radar altimeter and the suspended load to reduce a likelihood that said radar altimeter will process signals reflected by the suspended load.

2. A radar altimeter according to claim 1 wherein said load profile channel comprises:
   a load gate receiving reflected radar signal samples from said receiver;
   a filter receiving signals from said load gate;
   an intermediate frequency (IF) down converter receiving signals from said filter;
   a zero Hertz Doppler band pass filter receiving signals from said IF down converter; and
   an amplitude profile detector limiting an altitude processing sensitivity of said radar altimeter.

3. A radar altimeter according to claim 1 wherein said load gate is moved from zero feet out to approximately a maximum distance between the suspended load and the vehicle to generate an amplitude profile of the radar signature for the suspended load.

4. A radar altimeter according to claim 3 wherein said radar altimeter is configured to generate the amplitude profile only when the vehicle has a vertical velocity.

5. A radar altimeter according to claim 3 wherein said radar altimeter is configured to apply the amplitude profile to adjust radar returns indicating an amplitude within the specified range of the suspended load.

6. A radar altimeter according to claim 1 comprising a processor configured to receive signals from said at least one altitude processing channel and said load profile channel, said processor programmed to provide separation of the reflected radar signals from the suspended load and the ground utilizing differences in radar signatures of the reflected radar signals.

7. A radar altimeter according to claim 6 wherein said processor utilizes at least one of a Doppler frequency and an amplitude to separate the reflected radar signals.

8. A radar altimeter according to claim 1 wherein said at least one altitude processing channel comprises a Doppler filter tuned to a center frequency that is approximately equal to a Doppler frequency of the vertical velocity of the vehicle.

9. A method for processing radar returns received by a radar altimeter comprising:
    receiving a portion of the radar returns reflected by the ground;
    receiving a portion of the radar returns reflected by a load suspended under a vehicle which includes the radar altimeter; and
    limiting an altitude processing sensitivity of the radar altimeter between the radar altimeter and the suspended load to reduce a likelihood that the radar altimeter will process the portion of the radar returns reflected by the suspended load.

10. A method according to claim 9 wherein the radar altimeter includes a load processing channel, said method comprising tuning a Doppler band pass filter of the load processing channel to a zero Hertz center frequency.

11. A method according to claim 9 wherein the radar altimeter includes a load processing channel, said method comprising:
    moving a load gate of the load processing channel back and forth between zero and an approximate range of the suspended load from the vehicle;
    measuring an amplitude of the signals reflected by the suspended load at each load gate position; and
    generating an amplitude profile for the suspended load from the measured signals.

12. A method according to claim 11 wherein the amplitude profile is generated only when the vehicle has a vertical velocity.

13. A method according to claim 12 further comprising filtering out a non-zero Doppler shift of a ground return utilizing a zero-Doppler filter in the load processing channel.

14. A method according to claim 11 further comprising adjusting radar returns within a specified range of the suspended load according to the amplitude profile.

15. A method according to claim 9 further comprising separating the reflected radar signals from the suspended load and the ground utilizing differences in radar signatures of the reflected radar signals.

16. A method according to claim 15 wherein separating the reflected radar signals further comprises separating the reflected radar signals utilizing at least one of a Doppler frequency and an amplitude of the reflected radar signals.

17. A method according to claim 9 wherein the radar altimeter includes at least one altitude processing channel, said method comprising tuning a Doppler filter of the altitude processing channel to a center frequency that is approximately equal to a Doppler frequency of the vertical velocity of the vehicle.

18. A radar altimeter configured to receive radar returns reflected from the ground and from a suspended load under the vehicle incorporating said radar altimeter, said radar altimeter configured to separate the radar returns reflected from the suspended load from the radar returns reflected by the ground through utilization of differences in the radar signatures as criteria for separation.

19. A radar altimeter according to claim 18 wherein said radar altimeter utilizes differences in Doppler frequency and amplitude as criteria for separation, the Doppler frequency directly dependent on a relative velocity between said radar altimeter and the surface reflecting the transmissions from said radar altimeter.

20. A radar altimeter according to claim 18 wherein to separate the radar returns reflected from the suspended load from the radar returns reflected by the ground, said radar altimeter is configured to generate an amplitude profile for the suspended load from the measured signals reflected by the suspended load and adjust radar returns within a range of the suspended load according to the amplitude profile.

* * * * *